United States Patent [19]

van Kuijk

[11] Patent Number: 5,078,953
[45] Date of Patent: Jan. 7, 1992

[54] NATURAL CIRCULATION BOILING-WATER REACTOR WITH OUTPUT POWER REGULATION

[75] Inventor: Rudolf M. van Kuijk, San Jose, Calif.

[73] Assignee: General Electric Company, San Jose, Calif.

[21] Appl. No.: 702,152

[22] Filed: May 14, 1991

Related U.S. Application Data

[63] Continuation of Ser. No. 509,117, Apr. 16, 1990, abandoned.

[51] Int. Cl.$^5$ .............................. G21C 7/32; G21C 1/08
[52] U.S. Cl. ................................ 376/210; 376/241; 376/371; 376/377; 376/379
[58] Field of Search ........ 376/210, 241, 352, 370–375, 376/378–380, 211, 377

[56] References Cited

U.S. PATENT DOCUMENTS

| | | |
|---|---|---|
| 2,994,657 | 8/1961 | Petrick . |
| 3,034,977 | 5/1962 | Holl et al. . |
| 3,247,650 | 4/1966 | Kornbichler et al. . |
| 3,253,999 | 5/1966 | Weisman . |
| 3,284,312 | 11/1966 | West . |
| 3,429,775 | 2/1969 | Peterson . |
| 4,246,068 | 1/1981 | Lindner ............... 376/352 |
| 4,663,116 | 5/1987 | Masuhara et al. .......... 376/377 |
| 4,912,733 | 3/1990 | Gluntz .................. 376/371 |

FOREIGN PATENT DOCUMENTS

| | | | |
|---|---|---|---|
| 0112490 | 9/1979 | Japan | 376/210 |
| 3201599 | 8/1988 | Japan | 376/377 |
| 1023193 | 1/1989 | Japan | 376/210 |

Primary Examiner—Harvey E. Behrend
Attorney, Agent, or Firm—Robert R. Schroeder

[57] ABSTRACT

A natural circulation boiling-water reactor system using free-surface steam separation incorporates a steam separator near the inner wall of its reaction vessel and extending into a downcomer. Steam so collected supplements the main steam flow from the reactor vessel to drive a turbine, which in turn drives a generator. A flow controller opens and closes a valve to adjust the flow of steam from the steam collector to the turbine. The flow controller can be programmed to implement a predetermined power output level or to adjust power output as a function of load or time. When this level is exceeded, as indicated by feedback from the generator, the flow controller valve is constricted. The auxiliary steam flow to the turbine is directly decreased, reducing power output. Concomitantly, less steam is removed from the steam collector, and thus from the downcomer. As a result there is more carryunder steam, which reduces the power generated at the reactor core. Conversely, power output can be increased by opening the flow controller valve. Thus, ongoing power regulation is provided for a natural circulation boiling-water reactor system.

5 Claims, 2 Drawing Sheets

NATURAL CIRCULATION BOILING-WATER REACTOR WITH OUTPUT POWER REGULATION

This is a continuation of copending application Ser. No. 07/509,117 filed Apr. 16, 1990, now abandoned.

BACKGROUND OF THE INVENTION

The present invention relates to energy generation systems and, more particularly, to a natural convection boiling-water reactor of the type employing free-surface steam separation. Such reactors typically utilize fission to generate heat. A major objective of the present invention is to provide for enhanced power regulation in a natural convection reactor, for example, to provide load-following ability.

Fission reactors rely on fissioning of fissile atoms such as uranium isotopes (U233, U235) and plutonium isotopes (Pu239, Pu241). Upon absorption of a neutron, a fissile atom can disintegrate, yielding atoms of lower atomic weight and high kinetic energy along with several high-energy neutrons. The kinetic energy of the fission products is quickly dissipated as heat, which is the primary energy product of nuclear reactors. Some of the neutrons released during disintegration can be absorbed by other fissile atoms, causing a chain reaction of disintegration and heat generation. The fissile atoms in nuclear reactors are arranged so that the chain reaction can be self-sustaining.

To facilitate handling, fissile fuel is typically maintained in fuel elements. Typically, these fuel elements have a corrosion-resistant cladding. The fuel elements can be grouped together at fixed distances from each other in a fuel bundle. A sufficient number of these fuel bundles are combined to form a reactor core capable of a self-sustaining chain reaction. Neutron-absorbing control rods are inserted into the core to control the reactivity of the core. The reactivity of the core can be adjusted by incremental insertions and withdrawals of the control rod.

Reactors can be classified according to the method used to transfer fission-generated heat from the reactor core. In boiling-water reactors, water is converted to steam as it flows through the core. The steam can be conveyed from the reactor vessel enclosing the core to a turbine. The steam drives the turbine which, in turn, drives a generator to produce electricity. Forced-circulation boiling-water reactors utilize pumps to force water to circulate up through the reactor core and along a return path to the base of the core. "Carryover", i.e., water carried with the separated steam is removed by dryers, and the steam escapes from the vessel into a conduit to the turbine. The separated water returns to the forced-circulation system.

Natural-convection boiling-water reactors (NCBWRs) limit complexity by implementing coolant circulation without a circulation pumping subsystem. A chimney supports a steam column above the core, and this steam column serves as a driving head for the water circulation. Water circulating up through the core and the chimney is at least partially converted to steam which forms a relatively low pressure head above the core. Water recirculates down a downcomer annulus between the reactor vessel and the chimney and core. The water in the downcomer is denser than the steam and water mixture in the core and chimney region. The difference in density forces water up through the core and chimney and down through the downcomer.

Power regulation has been problematic in NCBWRs. As with other reactor types, the power output by a NCBWR can be varied by moving the control rods. However, moving control rods fatigues the cladding on the fuel elements so that this method of power regulation must be used sparingly. Control rods more effectively dampen fission in nearby fuel than in more distant fuel. A control rod inserted from below dampens fission more effectively in fuel located below the top of the control rod than above this level. Accordingly, the fuel elements are hotter above the control rod level than below the control level. Concomitantly, there is a vertical thermal gradient along the fuel element cladding which is steepest near the control rod top level. This thermal gradient is associated with substantially mechanical stress in the cladding. Each time a control rod is moved, the steep thermal gradients move along the cladding, which is thereby fatigued. Thus, while moving control rods is useful for infrequent gross power adjustments, it is not a viable approach to ongoing real-time power regulation.

In forced-circulation boiling-water reactors, power output can be regulated by controlling the pumping speed of the circulation system. Water is an effective moderator, i.e., it slows high energy neutrons so as to increase their likelihood of absorption. Steam is not an effective moderator. Faster pumping increases the velocity of water flowing through the core, and thus the mean height of the water in the column before it is vaporized. Thus, faster pumping results in more water and less steam in the core. Slower pumping causes vaporization at a lower point. Thus, greater pumping speed means more moderation and thus a stronger chain reaction, more heat generation, and a greater power output.

The effect of changing pumping speed on reactivity is much less than that obtainable moving control rods. Thus, changing pumping speed is useful for modulating power output about a gross level set using the control rods. The weaker effect of the pumping speed implies smaller effects on thermal gradients and stresses on the cladding. Moreover, the transition from water to steam as a function of core height is gradual; thus, changing pumping speed does not cause a singularly steep thermal gradient to move along the cladding. Therefore, modulating power output by regulating pumping speed does not significantly fatigue fuel-element claddings. Thus, pumping speed can be used on an ongoing basis to control power output in a forced circulation boiling-water reactor.

By definition, NCBWRs lack this recirculation pump and therefore power output cannot be controlled as a function of pumping speed. Some regulation can be provided by adjusting a valve on the steam line from the vessel to the turbine. Closing the valve reduces the steam reaching the turbine, reducing the drive on the turbine and, in turn, on the generator. However, closing this valve also causes a pressure buildup in the vessel. This forces more steam through the closed valve, offsetting the original power reduction. The net effect is too limited to provide useful load-following ability for a NCBWR. Another disadvantage is that the increase in vessel pressure is a safety concern.

The lack of load-following ability in NCBWRs has been circumvented in practice since existing designs have been part of larger networks of nuclear and non-nuclear electric power stations. Since the power output of fossil fuel power stations is easily regulated, the nuclear power station can be operated continuously at full power. The total power is adjusted at the fossil fuel stations. However, more powerful NCBWRs are being developed whose full generating capacity will not necessarily be absorbed at all times by the consumers. What is needed is an improved means for regulating power output which safely provides a substantial load-following power range without significantly fatiguing fuel elements.

SUMMARY OF THE INVENTION

In accordance with the present invention, a vapor trap is arranged to trap steam or other vapor entrained in the recirculating water or other liquid coolant. An auxiliary vapor line is provided for directing the vapor so trapped to help drive a turbine. A valve on the auxiliary vapor line adjusts the rate of carryunder evacuation so that the output power of the reactor system can be regulated.

A reactor incorporating the present invention includes a reactor vessel and its internals. The internals include a reactor core, a chimney which guides vapor upwardly to promote free-surface steam separation and to support a driving head for the natural convection circulation, a downcomer for feeding back fluid exiting the chimney down below the core. Steam emerging from the chimney top through the water in the reactor vessel and exits through a steam nozzle at the vessel top. An array of dryers can be disposed near the vessel top to trap any water being carried by the steam and return trapped water to the recirculation fluid.

Since there is a net loss of water + steam from the vessel through the exit port, means are provided to replenish the water in the vessel. This is normally accomplished by returning condensation from the turbine using a fluid handling system, including a feed pump which pumps water through a feedwater sparger which distributes subcooled return water around the downcomer.

"Carryunder", which refers to steam carried in the flow of water recirculating within the vessel and through the core, adversely affects the performance of a NCBWR. Carryunder comprises steam bubbles which have a high thermal energy per unit mass so that they can inpair the subcooling provided through the feedwater sparger. The result is a higher water temperature at the core entrance and more rapid boiling of the recirculation fluid as it flows up through the core. The more rapid boiling enlarges the steam voids within the core. The larger voids result in higher irreversible pressure drops through the fuel bundle than would be the case with smaller voids. This effect is amplified, since the larger voids tend to choke recirculation flow, despite a higher driving head. These irreversible head losses can be compensated in the design stage by providing greater chimney height, but this results in bigger vessel and significantly greater reactor costs.

Generally, carryunder is considered a negative fact of reactor operation. It adversely affects the driving head and blocks coolant circulation. Therefore, NCBWR design has had to address minimizing carryunder. The present invention provides for minimizing carryunder, while also utilizing carryunder to provide output regulation to a degree that had previously eluded NCBWRs this class of reactors.

In the course of the present invention, it was determined that a large percentage of bubbles emanating from the chimney moved primarily radially outward to the vessel wall. In general, large bubbles are forced upward by gravity and escape the recirculating flow; small bubbles are more likely to be swept into the downcomer by the recirculating flow. For intermediately sized bubbles, gravity and flow are mutually offsetting so that the primary motion of such bubbles is radially outward from the chimney and toward the vessel wall.

The present invention employs a steam trap including a toroidal steam collector and downwardly extending tubes or other channel means. The tubes extend into the downcomer along the vessel wall. Carryunder steam bubbles reaching the wall can be sheltered from the most forceful of the downcomer coolant currents. The trapped steam can then rise through the tubes and into the toroidal collector. The collected steam can be conveyed along the auxiliary conduit to the turbine. Since bubbles are escaping, there is less volume of steam within the downcomer, less carryunder, smaller voids in the core, and more power generated at the core.

When the power output is excessive, it can be reduced by partially closing a power regulation valve on the auxiliary conduit. Closing this valve reduces the amount of steam reaching the turbine, thus directly reducing reactor power. In addition, closing the valve reduces the amount of carryunder that can escape through the steam trap. The increased carryunder results in lower power output at the core. This results in less power delivered to the turbine.

Since the power generated at the core is reduced, there is no problem with pressure buildup within the reactor vessel. Thus, a major disadvantage of regulating output by adjusting a valve on the main steam line is avoided.

Thus, the present invention provides for reduced carryunder and For power output regulation suitable for practical load following. Much of the power regulating range falls within the margin of power improvement offered by the carryunder reduction provided by the steam trap. Therefore, the load following capability is attained largely "free of charge". These improvements are attained without increasing vessel size, reducing water volume flow or unduly increasing the complexity of the reactor vessel. These and other features and advantages of the present invention are apparent from the description below with reference to the following drawings.

BRIEF DECRIPTION OF THE DRAWINGS

DESCRIPTION OF THE PREFERRED EMBODIMENTS

Figure 1:
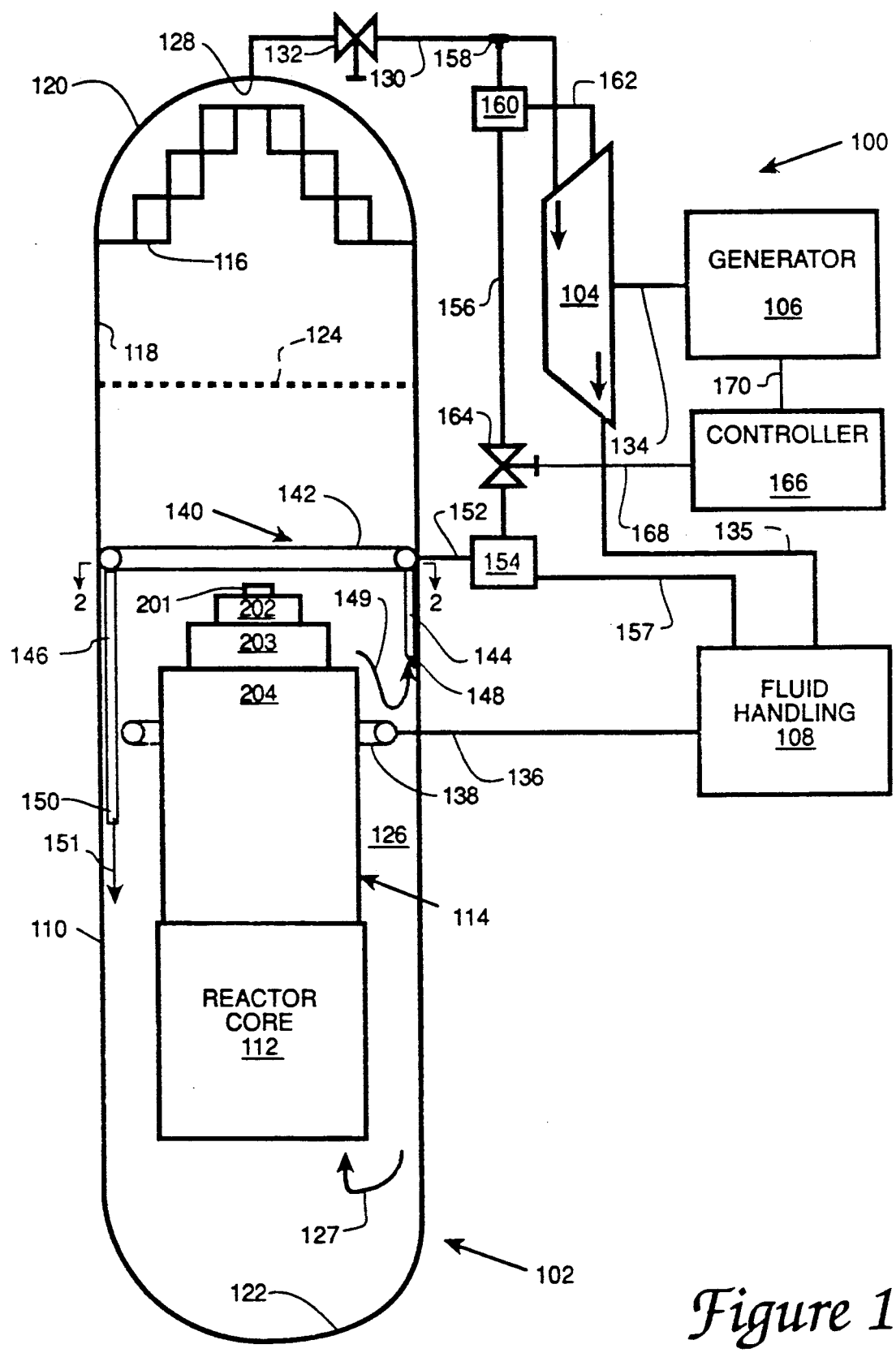
FIG. 1 is a schematic elevation view of a power generator system in accordance with the present invention.

A power generation system 100 includes a reactor system 102, a turbine 104, a generator 106, and a fluid handling section 108, as shown in FIG. 1. Reactor system 102 includes a reactor vessel 110 and its internals, e.g., a core 112, a chimney 114, and a dryer 116. Vessel 110 has a cylindrical wall 118, a semispherical top 120 and a semispherical bottom 122. Vessel 110 has a nominal water level 124 to which it is filled normally for operation. Reactor core 112 and chimney 114 are below nominal water level 124 so that they are primarily immersed in water; dryer 116 is above level 124 so it is primarily immersed in steam during reactor operation. A downcomer 126 extends between vessel wall 118 and chimney 114 and core 102. Downcomer 126 serves as the return path for water recirculating within vessel 110, as indicated by arrow 127.

Steam is transferred from reactor 102 through a steam nozzle 128 through top 120 if vessel 110 and along a main steam path, i.e., main steam line 130, which includes a main flow control valve 132. Valve 132 is used to decoupled turbine 104 from reactor 102 during maintenance. As discussed above, a valve, such as 132, in the main steam line does not provide for useful load following due to pressure buildup in vessel 110. Turbine 104 drives generator 106 via a shaft 134. Condensation in turbine 104 is conveyed to fluid handling section 108 via a water line 135.

Fluid handling section 108 performs a variety of conventional functions including collection of condensation, preheating of the return water, and pumping of return water along a feedwater line 136 to a feedwater sparger 138 in downcomer 126. Feedwater sparger 138 is a toroid which includes a multitude of horizontally directed nozzles through which feedwater enters the recirculation fluid, quenching the carryunder. The returned water replenishes vessel 110 which has lost the fluid output turbine 104.

Figure 2:
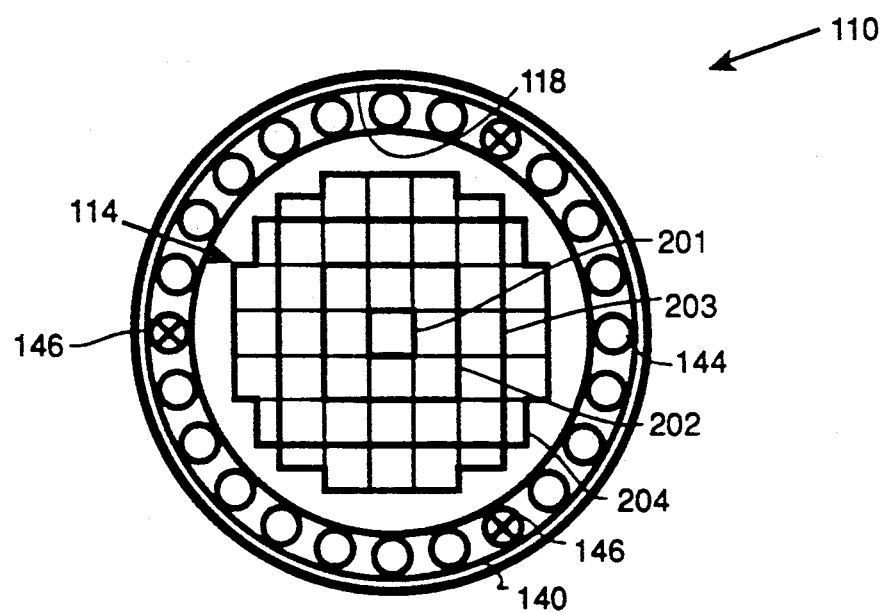
FIG. 2 is a sectional view taken along line 2—2 of FIG. 1.

The present invention provides for the removal of carryunder steam from downcomer 126 and the conveyance of the removed steam along an auxiliary steam path to turbine 104. The power output by generator 106 can be regulated by controlling the steam flow along the auxiliary steam path. A steam trap 140 is disposed near vessel wall 118. Upper plenum 170 is the interior of vessel 122 above chimney 114 and downcomer 126. Steam trap 140 includes a toroidal steam collector 142, twenty-one steam tubes 144, and three drain tubes 146, as shown in FIGS. 1 and 2. The twenty-four tubes 144 and 146 are arranged in circular series within vessel 110, which arrangement is conveyed in FIG. 2. All tubes are of stainless steel and have inner diameters of about 3". Each steam tube 144 includes an entrance 148 within downcomer 126; each entrance 148 is beveled to provide a greater area for capture of radially directed steam, as indicated by arrow 149. Each drain tube 146 contains an exit 150 within downcomer 126 through which drained water can be returned to downcomer 126, as indicated by arrow 151.

The auxiliary steam path includes a steam line 152, an auxiliary dryer 154, and another steam line 156; drain line 157 couples dryer 154 to fluid handling section 108. Steam line 156 merges with main steam line 130 at T-joint 158. A two-way valve 160 provides for diverting steam from steam line 156 along a steam line 162 whereby the auxiliary steam flow reaches turbine 104 before merging with the main steam flow along steam line 130. Two-way valve 160 is set according to the relative pressures of steam lines 130 and 156. When they are substantially equal, two-way valve 160 allows the auxiliary steam flow to continue along steam line 156 to merge with the main steam flow. When the pressure of steam line 156 is significantly below that of line 130, two-way valve 160 is set to direct the auxiliary steam flow along steam line 162. Steam line 162 introduces steam into a later stage of multistage turbine 104, by which stage the pressure of the main flow will have dropped to reduce the differential. The purpose of two-way valve 160 is to ensure that the main and auxiliary steam flows are substantially equal when they converge to prevent the main flow from reversing the auxiliary flow.

One advantage of this auxiliary path is the reduction of carryunder and a concomitant increase in the power generated by reactor system 100. Steam trap 140 and the auxiliary steam path remove carryunder steam from downcomer 126. Removing the carryunder steam from the downcomer increases the downcomer area available for water flow, thus increasing the water volume flow down the downcomer and up through the core. In addition, removing carryunder from the downcomer reduces the amount of steam entering the core. Increasing the volume of water entering the core and reducing the amount of steam entering the core both result in smaller voids in the core. Smaller voids result in greater neutron moderation which results in a greater power output from the core for a given control rod position. This permits a greater maximum reactor output and longer fuel lifetimes for a given power output level.

In accordance with the present invention, output power regulation is provided by an auxiliary flow control valve 164. Closing valve 164 directly reduces the steam available for driving turbine 104, so the output of generator 106 is reduced. In addition, reducing the auxiliary steam flow constrains the flow of steam from steam trap 104, increasing the pressure therein. This reduces the flow of carryunder steam into tubes 144; more carryunder steam remains in downcomer 126 to reduce the water volume flow rate and more carryunder steam is swept into the core. Both of these effects result in larger core voids and therefore reduced power generation in the core. Opening valve 164 has the opposite effects, increasing power output from the core.

The effect of closing auxiliary steam flow control valve 164 can be contrasted with the effect of closing main flow control valve 132. Closing either valve 132 or valve 164 directly reduces the steam to drive turbine 104 and therefore reduces the power output by generator 106. However, closing auxiliary valve 164 also quickly reduces the power generated at core 112 to correspond to the power reduction at the generator. This substantially avoids the pressure build up of concern when valve 132 is closed.

Auxiliary steam flow control valve 164 is controlled by a controller 166, which can be set to maintain a selected power output or to adjust output power as a selected function of load or time. An operator can adjust the setting of controller 166 or adjust valve 164 directly to affect reactor operation. Controller 166 is coupled to valve 164 via a control line 168 to provide the desired control. Controller 166 is coupled to generator 106 via data line 170 so that controller 166 can adjust valve 164 in response to changes in generator output and/or the load imposed on generator 106.

Chimney 114 includes forty-five chimney sections constituting four groups, a central first group 201, a second group 202, a third group 203 and a peripheral fourth group 204, as indicated in FIG. 2. Most of the chimney sections have square cross-sections. Fourth group 204 includes some half-size sections. The half-size sections allow chimney 114 to conform to wall 118 of vessel 110.

First group 201 includes a single section which is taller than the remaining forty-four sections, as indicated in FIG. 1. The height of group 201 defines a first group height or extension, which also defines the chimney height and the uppermost reach of downcomer 126. Second group 202 includes eight sections, radially outward and adjacent to the single section of first group 201. These eight second group sections share a common second group height less than the first group height but greater than the height of the remaining more peripheral sections. Third group 203 includes sixteen sections. These third group sections are radially outward from and adjacent to second group 202 and share a common third group height which is less than the second group height. Fourth group 204 contains twenty sections, which are radially outward from and adjacent to third group 203. The sections of fourth group 204 share a common fourth group height less than the third group height. Since each group has a different height, chimney 114 is said to be staggered. As indicated in FIG. 1, the difference between the second group height and the first group height is less than the difference between the third group height and the second group height. Likewise, the ddifference between the group height and the second group height is less than the difference between the fourth group height and the third group height. In other words, the stagger of chimney 114 becomes steeper away from its axis.

Steam collector 142 is situated just above the top level of chimney 114. Steam tube entrances 148 are located at about or just above the top level of fourth group 204. Drain tubes 146 extend sufficiently down into downcomer 126 that drain exits 150 are below sparger 138. Very little steam exits drain tubes 146, so there is no need to use coolant from sparger 138 to quench the drain tube output.

When generator 106 feeds back a power output value greater than that programmed into controller 166, valve 164 is constricted. The contribution of the auxiliary steam path is immediately diminished, reducing output power. Furthermore, constriction of valve 164 increases the pressure in steam line 152 and retards the flow of steam from steam collector 142. This in turn slows the escape of steam from downcomer 126 so that more of the downcomer annulus is obstructed by steam bubbles. This obstruction also reduces the pressure differential between chimney 114 and downcomer 126. The slower escape of steam and the increased obstruction of downcomer 126 result in a lower circulation rate. The lower circulation rate provides more time for water in core 112 to vaporize so that the voids in core 112 are larger. Less moderation occurs and therefore fissioning is decreased. Less heat is generated so that there is less energy to transfer to turbine 104, and thus, to generator 106.

When feedback from generator 106 informs controller 166 that the output power is too low, valve 164 is opened. More steam is directed through the auxiliary steam path to turbine 104, causing a direct power increase. In addition, carryunder is reduced, increasing the heat generated by core 112.

Relative to an unstaggered chimney with the same height as group 201, staggered chimney 114 provides additional recirculation volume in downcomer 126 above outer chimney group 204. This additional volume at the top of downcomer 126 which increases the time available for steam/water separation, reduces carryunder, and accommodates tubes 144 and 146. Thus, the staggered chimney configuration not only provides for reduced carryunder in its own right, but also provides room for steam trap 140 without constricting downcomer 126. Thus, there is a synergy between the use of staggered chimney 114 and steam trap 140.

Specific dimensions for the illustrated embodiment are approximately as follows. The chimney heights are 300 cm, 290 cm, 265 cm and 225 cm, respectively, for groups 201-204. The height differences between the first and second group is 10 cm, between the second and third group is 25 cm, and between the third and fourth group is 40 cm. This corresponds to a stagger which becomes progressively steeper toward the periphery. Square sections are 25 cm on each side and group 204 is 175 cm from side to opposing side. Vessel 110 is about 12 meters high and 2.8 meters in diameter. Core 112 is 190 cm high, the top 10 cm being inactive, and about 180 cm from side to opposing side. Core 112 has an octagonal cross section and its base is 2.4 meters above the center of vessel bottom 122. These dimensions correspond to those of the 60 megawatt reactor at Dodewaard, Holland. Reactor vessel 110 can be of carbon steel inside a stainless steel cladding, while chimney 114 can be of stainless steel.

As is apparent from FIG. 1, staggering provides greater volume for steam to separate from the recirculating water flow: all the space between the tops of groups 202-204 and the level defined by the top of central group 201 is added to the volume available for separation. Furthermore, the flows from the different groups are largely decoupled. Note that the flow from outermost group 204 can proceed upward a considerable distance before being swept radially outward by the combined flow of radially inward groups 201, 202, and 203. This extra upward clearance translates into critical separation time for peripheral group 204. The relatively steep step between the two most peripheral groups 203 and 204 accentuates this advantage. In addition, the staggering provides decoupling and additional separation time for second and third groups 202 and 203. Furthermore, the flow from central group 201 has additional separation time due to the greater total volume outside the chimney.

In a complementary fashion, staggering reduces carryover. Since there is more height available between the top of group 204 and water level 124, there is more separation time available for water to separate from the steam flow toward top 120 of vessel 110. This applies to a lesser but significant extent, to the sections of intermediate groups 202 and 203.

Further reduction of carryover can be accomplished by using a dryer which is elevation-staggered in a manner complementary to the chimney 114. Dryer 116 includes three annular elements, the central element being the highest and being disposed most directly over central group 201, which is also the group provided the least carryover advantage by the staggering of chimney 114. In other words, while staggerring chimney 114 does not add distance between the top of group 201 and water level 124, staggered dryer 116 does add distance between water level 124 and the central dryer element most directly above group 201. The staggering of dryer 116 also provides benefits due to the higher position of the intermediate dryer element. The peripheral dryer element is at the height of a conventional dryer, but is most directly over the two peripheral groups 203 and 204, which have the least need for additional separation space above water level 124. Thus, staggered dryer 116 enhances the separation of water from the steam output and distributes this enhancement to provide separation where it is needed most.

The novel chimney geometry also improves the distribution of heat transfer from reactor core 112. Being a conventional core, core 112 is generating more power in its center and less power toward its periphery. Optimal heat removal would require heat to be removed faster from the core center and more slowly from the core periphery. This occurs to some extent in a conventional natural circulation boiling-water reactor due to the greater heat flux at the core center between core and water. However, this temperature differential effect is not sufficient to provide optimal heat transfer distribution through the core.

The present configuration more closely approaches optimal heat transfer by forcing water faster through the core center. For example, since group 201 is higher than other sections, it supports a taller column of steam. The taller column of steam results in a greater pressure differential between the fluid through the core and chimney and the water in downcomer 126. The greater pressure differential results in a faster fluid flow through section 1 and the core center directly below. On the other hand, sections of peripheral group 204 support relatively short steam columns. This results in smaller pressure differentials and slower fluid flow through peripheral chimney sections and peripheral core regions below. Thus flow differences supplement the differences between density differentials among groups 201-204 to enhance the transfer of heat from core 112. Furthermore, reduced carryunder also enhances the ability of the recirculating water to remove heat from the core.

Thus, the provision of steam trap 140, in conjunction with the stagger chimney configuration, reduces carryunder and provides for power regulation by adjusting carryunder. Maximum system efficiency and output are increased and output power control is provided.

The present invention provides a range of embodiments not described above. The steam trap can include a series of steam tubes, as in the preferred embodiment, or a shroud or lining spaced from the vessel wall. The shroud can provide a single steam channel or can be sectioned to provide multiple channels. The release structure can be welded or otherwise attached to the wall. Alternatively, the tubes can be mounted together on a frame which is in turn attached to the vessel wall. This later arrangement can provide more ready access to the vessel internals for maintenance.

Different dimensions, materials, and power capabilities are provided for. It is not necessary that the reactor be a nuclear reactor or be used for generating electricity. The core can use fission, fusion, or other process for generating heat. Heat from the reactor can be used for some other purpose without an intermediate conversion in form. Coolants in addition to or other than water can be used. Steam or vapor used to transfer heat from a vessel can be recollected and returned to replenish fluid in the vessel. Alternatively, replenishment can be partially or completed effected by a separate fluid source. The invention can be practiced with or without a staggered dryer and with or without a staggered chimney. The reactor vessel can have different geometries, for example, the top and bottom need not be semispherical and the diameter of the vessel wall need not be constant over its height. These and other modifications to and variations upon the described embodiments are provided for by the present invention, the scope of which is limited only by the following claims.

What is claimed is:

1. A reactor system comprising:
   conversion means for converting kinetic energy of vapor flow into another form of energy;
   a natural-convection boiling-water reactor employing free-surface steam separation, said reactor including
      a reactor vessel having a sidewall and a top, said vessel having a vapor exit and a nominal liquid level,
      a reactor core for generating heat, said core being disposed within said vessel below said nominal liquid level, said core being adapted for converting liquid flowing therethrough to vapor,
      a chimney disposed within said vessel, said chimney extending from said core to a level below said nominal liquid level, said chimney having multiple vertical groups of chimney sections extending vertically from said core toward said nominal liquid level, each of said chimney sections radially confining fluid rising from said core toward said nominal liquid level,
      a downcomer providing a path for liquid exiting said chimney to return to said core, said downcomer extending axially over the combined axial extent of said core and said chimney, said downcomer extending radially from said core and said chimney to said sidewall, and
      trap means for evacuating predominantly vapor from said downcomer, said trap means including a trap located within said vessel and below said nominal liquid level, said trap defining a trap interior within said vessel and a trap exterior within said vessel, said trap means having at least one entrance means within said downcomer so as to provide at least one intravessel fluid flow path between said trap interior and said downcomer, said trap confining said trap interior so that the only intravessel fluid paths from said trap interior to said nominal liquid level are through said downcomer;
   main transfer means for transferring vapor external to said trap and above said nominal liquid level out of said vessel through said vapor exit and to said conversion means;
   auxiliary transfer means for transferring vapor from said trap interior to said conversion means; and
   valve means for regulating the rate at which vapor is evacuated from said trap means through said auxiliary transfer means so as to control the amount of carryunder in said downcomer and thus the void volume in said core, said valve means being mechanically coupled to said auxiliary transfer means so that constricting said valve diminishes vapor flow through said auxiliary transfer means, but not through said main transfer means;
   whereby, the power output by said reactor system can be regulated by adjusting said valve.

2. A reactor system as recited in claim 1 wherein said conversion means includes a turbine and a generator, said turbine being coupled to said generator so that when said turbine is driven, said generator generates electricity, said main and said auxiliary transfer means transferring vapor from said vessel to said turbine to drive said turbine.

3. A reactor system as recited in claim 1 wherein said conversion means is coupled to said valve means so that said valve means is adjusted as a function of the power output by said conversion means to maintain a predetermined power output level.

4. A reactor system as recited in claim 1 wherein said trap is a vapor collecting collar and said trap means further comprises a circular series of tubes extending downward from said collar into said downcomer so that steam flows from said downcomer and into said collar through said tubes, said tubes including said trap means entrance.

5. A reactor system as recited in claim 1 wherein said groups are arranged radially relative to each other so that a group situated radially outward relative to another group is shorter than it.

* * * * *